United States Patent [19]

Bordovsky

[11] 4,383,740
[45] May 17, 1983

[54] INFINITY IMAGE VISUAL DISPLAY SYSTEM

[75] Inventor: Robert Bordovsky, Arlington, Tex.

[73] Assignee: Rediffusion Simulation Incorporated, Arlington, Tex.

[21] Appl. No.: 202,682

[22] Filed: Oct. 31, 1980

[51] Int. Cl.³ .................. G02B 27/18; G02B 5/10; G09B 9/08
[52] U.S. Cl. .................. 350/504; 350/294; 434/43; 358/104; 358/238
[58] Field of Search ........ 350/294, 291, 174, 55, 350/27; 358/104, 238, 239, 250; 434/43, 44

[56] References Cited

U.S. PATENT DOCUMENTS

| 3,432,219 | 3/1969 | Shenkev et al. ........ 350/27 |
| 3,549,803 | 12/1970 | Becht et al. ........ 350/294 |
| 3,785,715 | 1/1974 | Mecklenborg ........ 350/174 |
| 3,880,509 | 4/1975 | Herndon ........ 350/294 |

Primary Examiner—Jon W. Henry
Attorney, Agent, or Firm—Nims, Howes, Collison & Isner

[57] ABSTRACT

An infinity image visual display system comprising an input image source, a concave projection mirror, a concave eyepiece mirror and a single path-folding beamsplitter. The projection mirror images the input image source at the focal surface of the eyepiece mirror, which image is reflected by the eyepiece mirror and focused at infinity.

6 Claims, 7 Drawing Figures

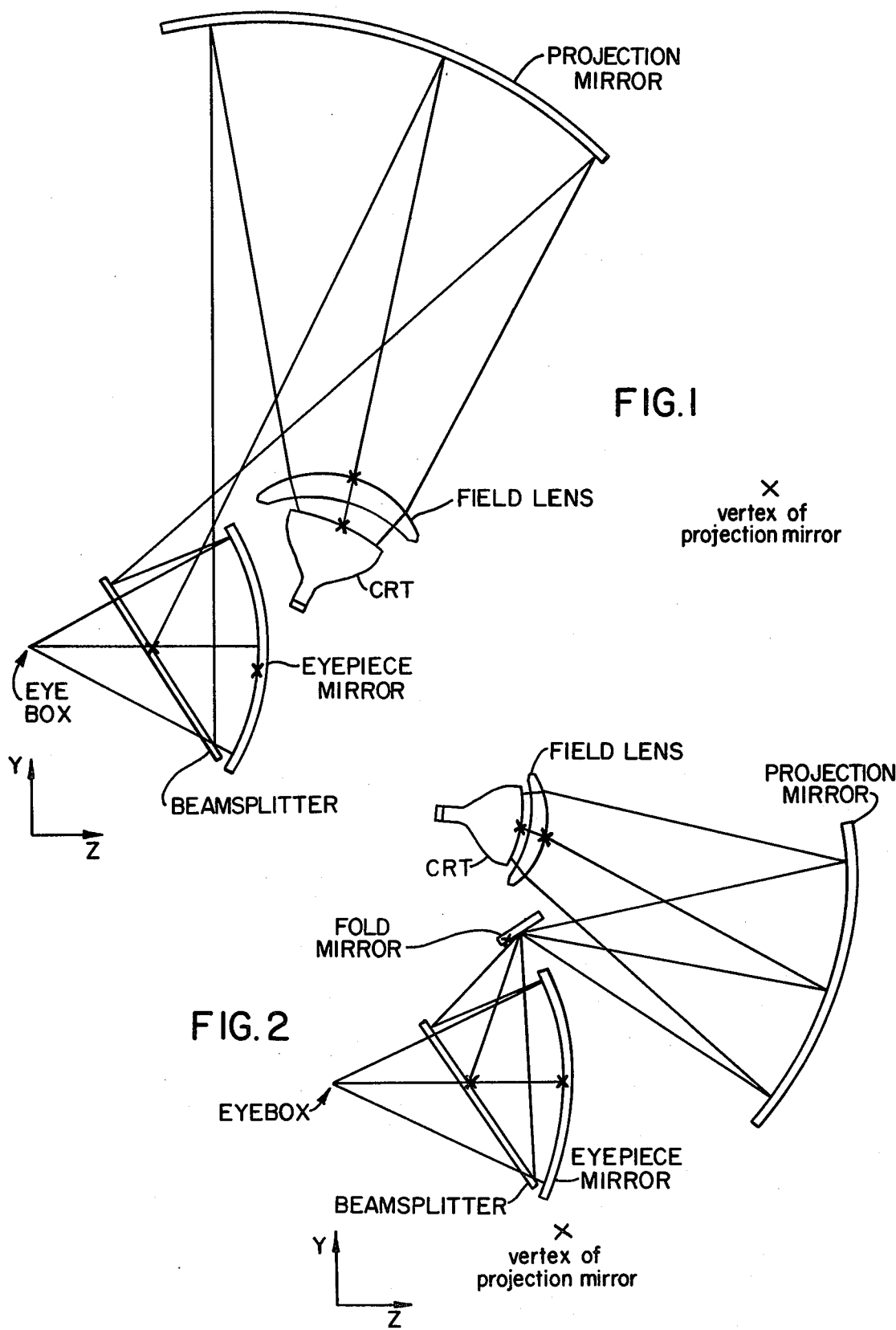

INFINITY IMAGE VISUAL DISPLAY SYSTEM

BACKGROUND OF THE INVENTION

As the cost of training pilots in actual vehicles, such as modern commercial and military aircraft, large ships, trucks, etc., has risen, there has been an increased demand for better simulators and trainers in which training can be done at much lower cost. One way of improving simulation fidelity and the training value of such devices, is to include therein a display system which can provide the trainee with realistic visual cues. Ideally, such a visual display should provide an image that appears to be at infinity, over as large a field of view as is visible from the actual vehicle.

One of the best ways of developing an image at infinity is to use a spherical mirror as a collimator. In a well known simulator display system of this genre, a beamsplitter and concave spherical mirror are located in front of a trainee. The beamsplitter is used to fold the optical axis so that an input image source can be located out of the direct field of view of the trainee, at an elevated position optically equivalent to the focal surface of the spherical mirror. The input image is projected from said source down onto the beamsplitter, from which it is reflected toward the concave surface of the spherical mirror. The visual scene is then reflected back from the mirror, through the beamsplitter, to the trainee's eye, which is located on the optical axis of the display, near the center of curvature of the mirror.

Although any one of a number of available image generators can be employed with the above-described infinity image display, frequently a cathode ray tube (CRT), having its faceplate located in the focal surface of the spherical mirror, is used as the image source for the display. This CRT-mirror-beamsplitter combination is widely used in vehicle simulators, especially flight simulators, to provide realistic out-of-the-window scenes.

The primary deficiency of CRT-mirror-beamsplitter display systems is that they provide only a limited vertical field of view. The CRT limits the top of the field of view, and the intersection of the beamsplitter and the mirror limits the bottom field of view. The vertical field of view of such display systems is thus constrained to approximately 31°. Such display systems are disclosed in U.S. Pat. Nos. 3,432,219; 3,659,920; and 4,112,462.

As a result of efforts to increase the field of view of the above-described visual display systems, two mirror systems have been developed. Two mirror systems developed to date include a projection mirror, an eyepiece mirror, two path-folding beamsplitters and a curved input image surface such as a CRT. The projection mirror images the input surface at the focal surface of the eyepiece mirror, which image is reflected by the eyepiece mirror and focused at infinity. The range of vertical and horizontal fields of view is extremely large. Typical two mirror systems may exhibit horizontal and vertical fields of view, for example, of 67° by 65° or 110° by 50°. A plurality of two mirror systems may be disposed in a side-by-side array to form a mosaic system thereby increasing either the vertical field of view or the horizontal field of view or both. Moreover, although a two mirror system normally requires a great amount of space, a fold mirror may be utilized to make the system more compact. Such two mirror display systems are disclosed in U.S. Pat. Nos. 3,549,803; 3,709,581; and 3,785,715.

The major drawback of present two mirror visual display systems is that the systems are light inefficient, i.e., the viewed image is extremely faint relative to the brightness of the input image. Assuming each mirror reflects approximately eighty percent of the light received and each beamsplitter is fifty percent reflective and fifty percent transmissive, the viewed image brightness is only four percent of the input image brightness. Consequently, there is a need for an infinity image visual display system that offers large vertical and horizontal fields of view while being relatively light efficient. Ideally such a system should be adaptable for mosaicing.

SUMMARY OF THE INVENTION

The present invention provides a solution to the abovementioned problems associated with previous infinity image visual display systems by utilizing a concave projection mirror, a concave eyepiece mirror, a single path-folding beamsplitter, and a curved image input surface such as a CRT or a rear projection screen. The projection mirror images the input surface at the focal surface of the eyepiece mirror, which image is reflected by the eyepiece mirror and focused at infinity. The display system is relatively light efficient, is adaptable for mosaicing, provides large horizontal and vertical fields of view, and is relatively small even without a fold mirror.

For a better understanding of the invention and the attendant advantages thereof, reference may be made to the following descriptions of representative embodiments taken in conjunction with the figures of the accompanying drawings in which:

BRIEF DESCRIPTION OF THE DRAWINGS

FIG. 1 is a schematic illustration of three light ray traces through and the optical elements comprising an infinity image visual display system according to one embodiment of the present invention;

FIG. 2 is a schematic illustration of three light ray traces through and the optical element comprising an infinity image visual display system according to another embodiment of the present invention;

DESCRIPTION OF PREFERRED EMBODIMENTS

Figure 3:
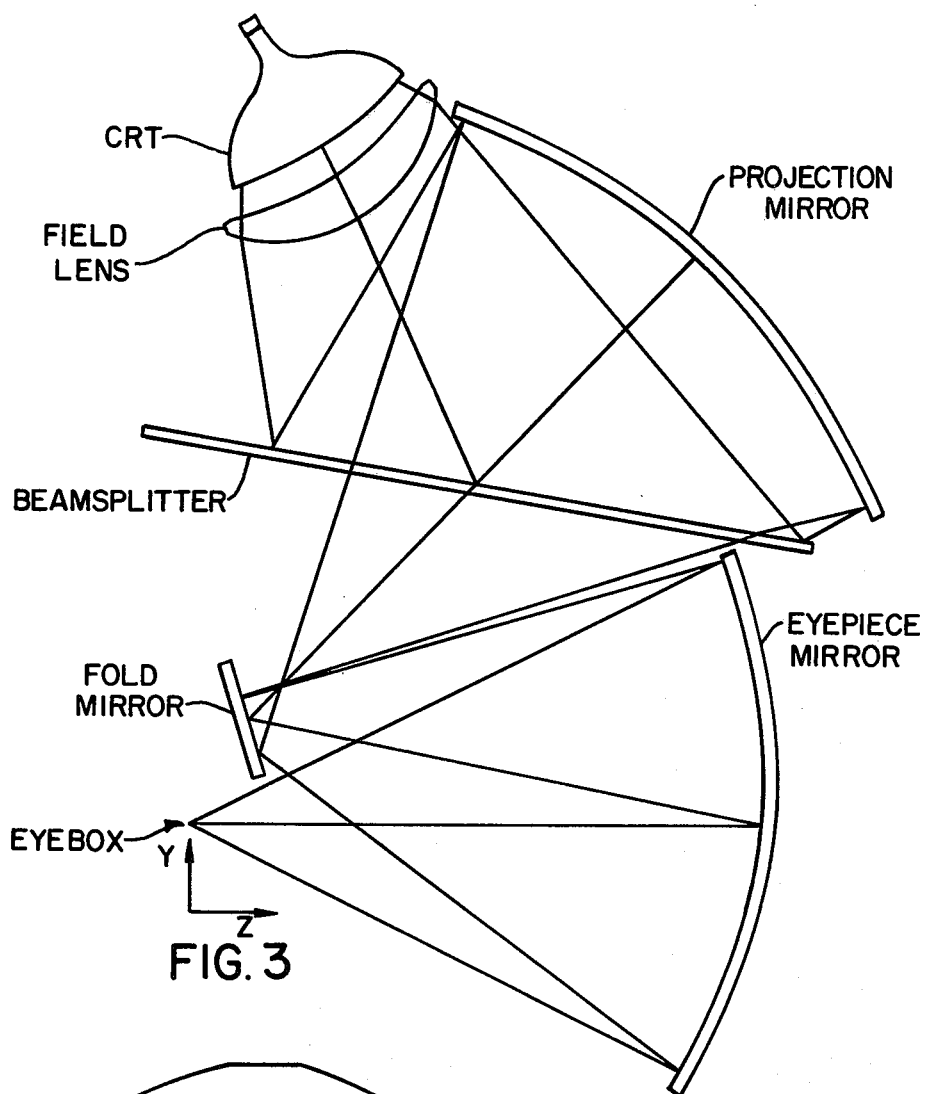
FIG. 3 is a schematic illustration of three light ray traces through and the optical elements comprising an infinity image visual display system according to yet another embodiment of the present invention.

The infinity image visual display systems of the present invention include an image input surface such a CRT face, a concave projection mirror, a single path-folding beamsplitter, and a concave eyepiece mirror. The projection mirror images the input surface at the focal surface of the eyepiece mirror, which image is reflected by the eyepiece mirror and focused at infinity.

Each of the display systems shown in the accompanying drawings includes a field lens located adjacent to the image input source. While the field lens is not necessary for the operation of a display system, the field lens is designed to counteract the Petzval contribution to curvature of the image surface by the image-forming surface and thereby improves the quality of the viewed image. The field lens has the drawback of introducing some chromatic aberration into the image, however, the amount of chromatic aberration introduced may be minimized by placing the field lens as close as possible to the image source, using a material for the field lens having low dispersion, i.e., a high "V" number, and keeping the power of the field lens as low as possible. Also, lateral chromatic aberration may be artificially introduced in the image source which counteracts the chromatic aberration introduced by the field lens. The preferred material for the relatively large lens used in the system is acrylic plastic (polymethyl methacrylate). Moreover, the field lens may comprise an achromatic doublet consisting of a strong positive acrylic element and a weaker negative element of some other more dispersive material such as polystyrene.

Two embodiments of the display system according to the present invention are illustrated in FIG. 1 and FIG. 2. A primary difference between the two systems is that the system in FIG. 2 includes a fold mirror positioned at the interior pupil of the system. The fold mirrors provided in some of the present systems are used not only for compacting the systems, but also for optical advantages by designing an aspherical fold mirror surface to correct aberrations such as coma or astigmatism. A trial design for each system utilized elements having the parameters designated in the following chart:

|  |  | FIG. 1 | FIG. 2 |
| --- | --- | --- | --- |
| CRT FACE | | | |
| Shape | | spherical having a radius of 40.7 inches | spherical having a radius of 40.7 inches |
| Vertex Location | | | |
| | Y | 31.386 inches | 69.546 inches |
| | Z | 86.722 inches | 51.365 inches |
| | Tilt | 61.59 degrees | −8.76 degrees |
| FIELD LENS | | | |
| Shape | | two spherical surfaces having radii of curvature of 27.559 inches and 348.911 inches | two spherical surfaces having radii of curvature of 18.424 inches and 60.476 inches |
| Thickness Along The Axis of Rotational Symmetry | | 11.1 inches | 7.0 inches |
| Vertex Location | | | |
| | Y | 45.807 inches | 66.771 inches |
| | Z | 90.849 inches | 59.667 inches |
| | Tilt | 74.03 degrees | −14.44 degrees |
| PROJECTION MIRROR | | | |
| Shape | | aspheric, nearly ellipsoidal with foci at the centers of the CRT face and the aerial image, having a major axis of 25.0 feet and a minor axis of 24.8 feet, and having the following parameters:<br><br>$c = -.00676585$<br>$k = -.016378$<br>$A = 0$<br>$B = -5.83061 \, (10^{-14})$<br>$C = 3.21174 \, (10^{-18})$ | aspheric, virtually ellipsoidal with foci at the interior pupil and about 2 feet behind the CRT face, having a major axis of 17.42 feet and a minor axis of 17.32 feet, and having the following parameters:<br><br>$c = .00968105$<br>$k = -.011783$<br>$A = 0$<br>$B = 6.76038 \, (10^{-13})$<br>$C = 5.45572 \, (10^{-17})$ |
| Vertex Location | | | |
| | Y | 43.162 inches | −40.942 inches |
| | Z | 213.392 inches | 63.306 inches |
| | Tilt | 8.99 degrees | −75.98 degrees |
| FOLD MIRROR | | | |
| Shape | | none | aspheric having the following parameters:<br>$c = .00252876$<br>$k = 0$<br>$A = -7.18502 \, (10^{-6})$<br>$B = 4.62680 \, (10^{-8})$<br>$C = -1.16171 \, (10^{-10})$ |
| Vertex Location | | | |
| | Y | — | 37.984 inches |
| | Z | — | 48.447 inches |
| | Tilt | — | −62 degrees |
| BEAMSPLITTER | | | |
| Shape | | planar | cylindrical having a radius of 1388.5 inches |
| Vertex Location | | | |
| | Y | 0 inches | −.168 inches |
| | Z | 35.00 inches | 36.051 inches |
| | Tilt | 31.25 degrees | 34 degrees |
| EYEPIECE MIRROR | | | |
| Shape | | "potato chip" having the follow- | spherical having a radius of |

| | FIG. 1 | FIG. 2 |
|---|---|---|
| | ing parameters: | −66.667 inches |
| | $c_x = -.01494234$ | |
| | $c_y = -.0154$ | |
| | $k_x = .009205$ | |
| | $k_y = -.129360$ | |
| | $B = 1.33978 \ (10^{-10})$ | |
| | $B' = -.0184464$ | |
| Vertex Location | | |
| Y | −7.878 inches | .112 inches |
| Z | 64.444 inches | 63.166 inches |
| Tilt | −7.05 degrees | 0 degrees |

For the aspherical surface design:

$$Sag = \left[\frac{cR^2}{1 + \sqrt{(1 - [1 + k]c^2R^2)}}\right] + AR^4 + BR^6 + CR^8$$

and for the "potato chip" surface design:

$$Sag = \left[\frac{c_xX^2 + c_yY^2}{1 + \sqrt{([1 - (1 + k_x)c_x^2X^2][1 - (1 + k_y)c_y^2Y^2])}}\right] +$$

$$B[(1 - B')X^2 + (1 + B')Y^2]^3$$

where $$R^2 = X^2 + Y^2$$

and where $X = Y = 0$ at the vertex of each surface. Each surface comprises the set of sagittal points, each sagittal point located at a distance equal to the value of "Sag" for a particular XY coordinate directly above the XY coordinate position on a line perpendicular to the XY plane passing through the XY coordinate position.

A different Cartesian coordinate system is used to define the location of the elements in each system shown in FIG. 1 and FIG. 2. This latter coordinate system is centered at the center of the eyebox of each system, and the vertex of each element of the system is defined by its coordinate position in the YZ plane of that coordinate system. In the drawings of FIG. 1 and FIG. 2 the location of the vertex of each element is designated by an "X" (Note also that the vertex of the field lens is here considered to be the vertex of the field lens convex surface.). The tilt of each element of the system is defined by its inclination with respect to the Z axis, a counterclockwise rotation from the Z axis being defined as a positive tilt.

Both systems shown in FIG. 1 and FIG. 2 achieved horizontal and vertical fields of view within the eyebox of about 43° and 55°, respectively, and, like all the systems of the present invention, the viewed image brightness was about sixteen percent of the input image brightness. The trial design for FIG. 2 was preferred over the trial design for FIG. 1 because (1) the system occupies less space (nine feet by thirteen feet compared with seventeen feet by fourteen feet for the FIG. 1 design); (2) the chromatic aberration is substantially less and within tolerable limits; and (3) the system is stackable for mosacing, whereas the FIG. 1 design is not stackable due to projection mirror overlap.

Figure 6:
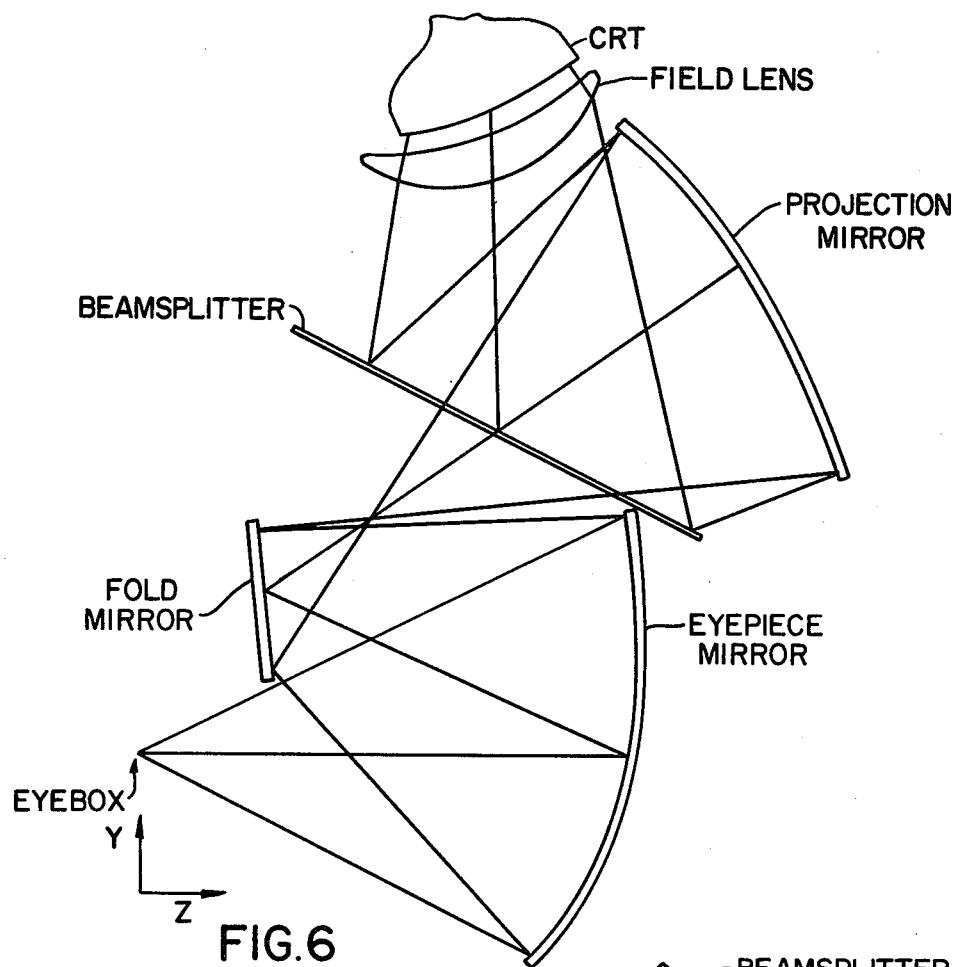
FIG. 6 is a schematic illustration of three light ray traces through and the optical elements comprising an infinity image display system according to another embodiment of the present invention.
Figure 7:
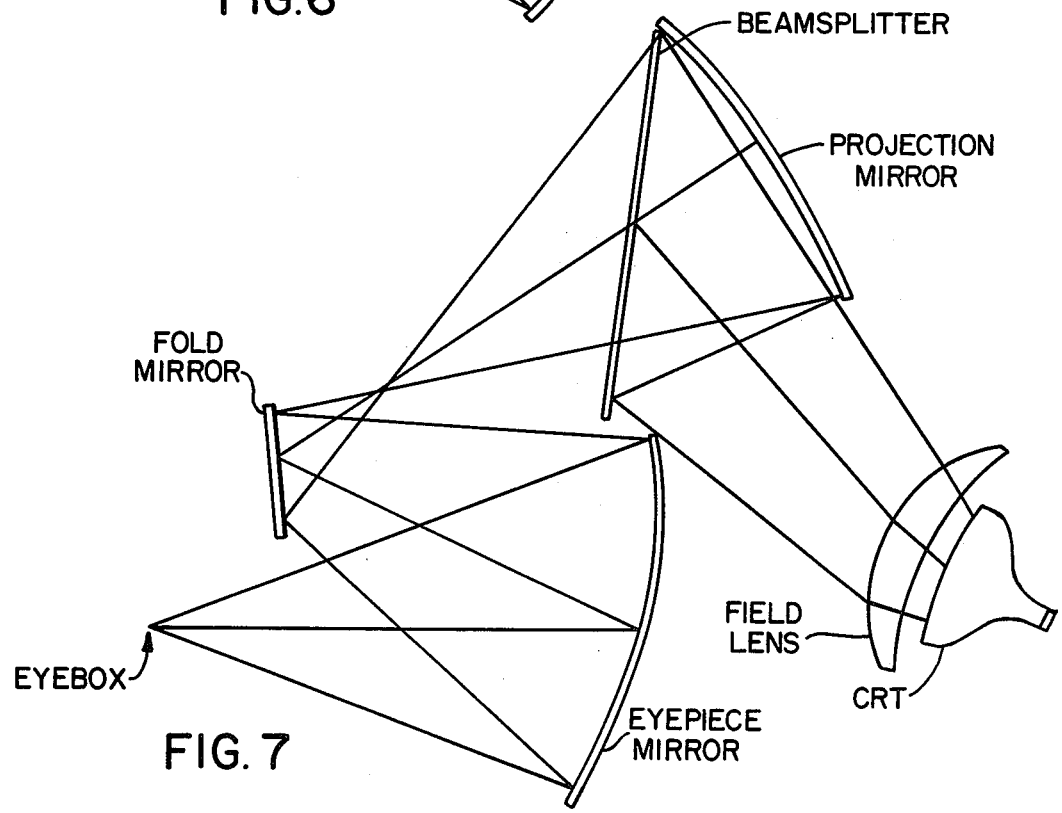
FIG. 7 is a schematic illustration of three light ray traces through and the optical elements comprising an infinity image visual display system according to still another embodiment of the present invention.

Three other embodiments of the display system according to the present invention are illustrated in FIG. 3, FIG. 6, and FIG. 7, where the system illustrated in FIG. 7 is virtually identical to the system illustrated in FIG. 6, except that the CRT has been placed behind the eyepiece mirror and the beamsplitter has been oriented accordingly. Also, the system design shown in FIG. 7 offers horizontal and vertical fields of view of 55° and 43°, respectively. A trial design for the systems shown in FIG. 3 and FIG. 6 utilized elements having the parameters designated in the following chart:

| | FIG. 3 | FIG. 6 |
|---|---|---|
| CRT FACE | | |
| Shape | spherical having a radius of 40.7 inches | spherical having a radius of 40.7 inches |
| Central Ray Incidence Point | | |
| Y | 73.12 inches | 76.44 inches |
| Z | 13.67 inches | 40.54 inches |
| Tilt | −54.09 degrees | −63.09 degrees |
| FIELD LENS | | |
| Shape | two spherical surfaces having radii of curvature of 17.1641 inches and 27.5926 inches | two spherical surfaces having radii of curvature of 17.3 inches and 42.6 inches |
| Thickness Along The Axis of Rotational Symmetry | 4.4 inches | 5.9 inches |
| Location of Point "F" | | |
| Y | 68.59 inches | 72.66 inches |
| Z | 15.68 inches | 39.7 inches |
| Tilt | −53.06 degrees | −71.32 degrees |
| PROJECTION MIRROR | | |
| Shape | spherical having a radius of 80 inches | spherical having a radius of 75 inches |
| Central Ray Incidence Point | | |
| Y | 59.30 inches | 57.98 inches |

|  | FIG. 3 | FIG. 6 |
|---|---|---|
| Z | 51.67 inches | 69.63 inches |
| Tilt | 46.4 degrees | 35.00 degrees |
| FOLD MIRROR | | |
| Shape | cylindrical having a radius of 533 inches | cylindrical having a radius of 59.6 inches |
| Central Ray Incidence Point | | |
| Y | 10.99 inches | 17.91 inches |
| Z | 5.91 inches | 15.13 inches |
| Tilt | 17.46 degrees | 5.00 degrees |
| BEAMSPLITTER | | |
| Shape | planar | planar |
| Central Ray Incidence Point | | |
| Y | 35.61 inches | 38.17 inches |
| Z | 29.54 inches | 41.33 inches |
| Tilt | 79.96 degrees | 63.00 degrees |
| EYEPIECE MIRROR | | |
| Shape | spherical having a radius of 60 inches | spherical having a radius 60 inches |
| Central Ray Incidence Point | | |
| Y | 0 inches | 0 inches |
| Z | 59.70 inches | 57.08 inches |
| Tilt | −5.77 degrees | −12.5 degrees |

The parameters of the system designs shown in FIG. 3 and FIG. 6 correspond to those previously described in reference to FIG. 1 and FIG. 2, however, the location of each element is defined by the coordinate position in the YZ plane of the point of incidence of the central ray on each element (except for the field lens, where the location is defined by point "F", the point where the axis of symmetry intersects the concave surface).

The system designs shown in FIG. 3 and FIG. 6 are preferable over the previously described designs primarily because the projection mirrors and the eyepiece mirrors are spherical and therefore can be manufactured with simple tooling, whereas some of the mirrors in the previously described designs require special fabrication techniques. The performance of each of the designs shown in FIG. 3 and FIG. 6 is comparable to the performance of the FIG. 2 design and generally acceptable. Furthermore each of the FIG. 3 and FIG. 6 designs is stackable.

Figure 5:
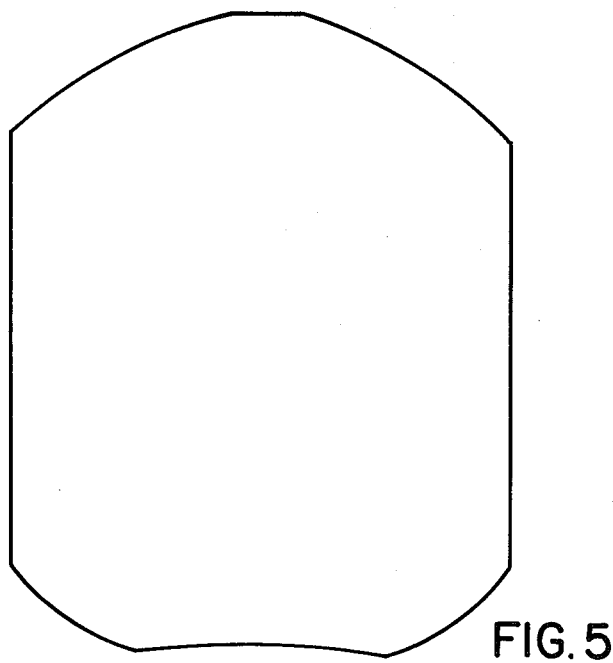
FIG. 5 is a representation of the boundary of the viewed image in the infinity visual display system shown in FIG. 3.

The system designs shown in FIG. 3 and FIG. 6 each achieved horizontal and vertical fields of view within the eyebox of about 43° and 55°, respectively. FIG. 5 illustrates the boundary of the binocular field of view as seen from the eyebox center of the display system illustrated in FIG. 3. The corners of the otherwise 43° by 55° field of view are clipped due to the clear aperature size of the projection mirror used, however, the clipping may be diminished or eliminated by the use of larger projection mirrors. The binocular field of view of the display system of FIG. 6 had no clipping.

Figure 4:
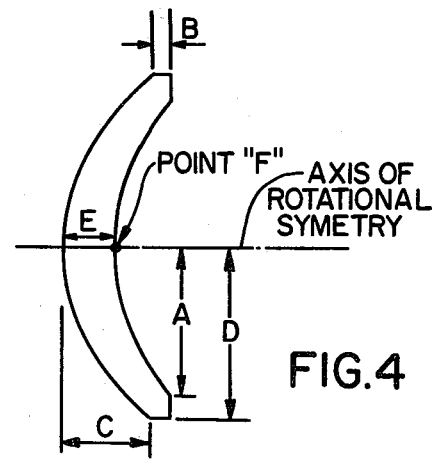
FIG. 4 is a schematic cross sectional illustration of a field lens for use in infinity image visual display systems according to the present invention.

FIG. 4 illustrates the positive field lens used in the display system illustrated in FIG. 3. The lens is provided with two spherical surfaces having radii of 27.5926 inches and 17.1641 inches. The dimensions of the lens represented in FIG. 4 as A,B,C,D and E equal 12.2848 inches, 1.1727 inches, 6.1238 inches, 13.1423 inches and 4.4109 inches, respectively.

The beamsplitters illustrated in the drawings first reflect incident light onto a reflective surface and then transmit the light reflected from that surface, however, it should be apparent that the beamsplitters and reflective surfaces may be arranged such that the beamsplitters first transmit incident light onto a reflective surface and then reflect the light reflected from that surface. Also, the described systems may include additional elements for diminishing aberrations and distortions.

Although particular embodiments of the present invention have been described and illustrated herein, it should be recognized that modifications and variations may readily occur to those skilled in the art and that such modifications and variations may be made without departing from the spirit and scope of my invention. Accordingly, all such modifications and variations are included in the scope of the invention as defined by the following claims:

I claim:

1. An infinty image visual display system including an image source,
   an eyepiece mirror disposed remote from said image source for focussing a transmitted image of said image source located at its focal surface at infinity,
   means for transmitting said image of said image source from said image source to said focal surface of said eyepiece mirror along a folded, optically offset and non-orthometric path,
   a concave compound curved projection mirror selectively positioned in axially offset, non-orthometric relation to said image source to receive and reflect an image of said image source toward the focal surface of said eyepiece mirror,
   only one path-folding beamsplitter disposed in the light path between said visual image source and said eyepeice mirror for cooperatively defining, in association with said selectively positioned projection mirror and image source, said optically offset and non-orthometrically folded image transfer path intermediate said image source and said eyepiece mirror.

2. An infinity image visual display system according to claim 1 further including a fold mirror disposed in the light path intermediate said projection mirror and said eyepiece mirror.

3. An infinity image visual display system according to claim 1 further including a positive field lens located adjacent to said visual image source and disposed in the light path between said visual image source and said projection mirror.

4. An infinity image visual display system according to claim 1 wherein said projection mirror is spherical and wherein said eyepiece mirror is spherical.

5. An infinity image visual display system including a visual image source, a concave ellipsoidal projection mirror, a single path-folding beamsplitter, and a concave spherical eyepiece mirror, said projection mirror having the foci thereof located at the visual image source and operative to image the latter at the focal surface of said eyepiece mirror, said eyepiece mirror reflecting the image and focusing the image at infinity, said path-folding beamsplitter disposed in the light path between said visual image source and said eyepiece mirror.

6. An infinity image visual display system including
a visual image source,
a concave projection mirror,
a concave eyepiece mirror having a focal surface,
said projection mirror positioned to image the visual image source at the focal surface of said eyepiece mirror,
said eyepiece mirror reflecting the image and focusing the image at infinity,
only one path-folding beamsplitter disposed in the light path between said visual image source and said eyepiece mirror and
a fold mirror disposed in the light path generally midway between said projection mirror and said eyepiece mirror.

* * * * *